(12) United States Patent
Jones

(10) Patent No.: US 6,988,574 B2
(45) Date of Patent: Jan. 24, 2006

(54) ONE-WAY AIR DUCT FOR ENGINE COMPARTMENT COOLING

(75) Inventor: David A. Jones, West Middlesex, PA (US)

(73) Assignee: Jones Performance Products, Inc., West Middlesex, PA (US)

(*) Notice: Subject to any disclaimer, the term of this patent is extended or adjusted under 35 U.S.C. 154(b) by 0 days.

(21) Appl. No.: 10/924,414

(22) Filed: Aug. 24, 2004

(65) Prior Publication Data
US 2005/0045394 A1 Mar. 3, 2005

Related U.S. Application Data

(60) Provisional application No. 60/498,738, filed on Aug. 28, 2003.

(51) Int. Cl.
B62D 27/00 (2006.01)

(52) U.S. Cl. .................. 180/68.1; 180/69.2; 123/41.58

(58) Field of Classification Search .............. 180/68.1, 180/68.2, 68.3, 69.2, 69.21; 123/41.56, 198 E, 123/41.7, 195 C; 296/208, 213; 454/147, 454/148, 165
See application file for complete search history.

(56) References Cited

U.S. PATENT DOCUMENTS

| | | | | |
|---|---|---|---|---|
| 778,455 A | * | 12/1904 | Lewis | 180/68.1 |
| 1,183,670 A | * | 5/1916 | Riker | 180/68.1 |
| 1,713,560 A | * | 5/1929 | Shelley | 180/68.1 |
| 1,855,038 A | * | 4/1932 | Walker | 180/68.3 |
| 1,875,619 A | * | 9/1932 | Lent | 180/68.1 |
| 2,036,485 A | * | 4/1936 | Lintern et al. | 296/208 |
| 2,852,997 A | * | 9/1958 | Leslie et al. | 454/147 |
| 3,301,484 A | * | 1/1967 | De Castelet | 454/148 |
| 3,481,117 A | * | 12/1969 | McKinlay | 180/68.3 |
| 4,235,298 A | | 11/1980 | Sackett | |
| 4,558,634 A | * | 12/1985 | Oshiro et al. | 454/165 |
| 4,850,444 A | * | 7/1989 | Bojanowski et al. | 180/68.1 |
| 4,969,533 A | * | 11/1990 | Holm et al. | 180/69.2 |
| 4,971,172 A | | 11/1990 | Hoffman | |
| 5,042,603 A | | 8/1991 | Olson | |
| 5,579,858 A | * | 12/1996 | Petersen et al. | 180/68.3 |
| 5,618,323 A | | 4/1997 | Shearn | |
| 5,794,733 A | * | 8/1998 | Stosel et al. | 180/68.1 |
| D432,073 S | | 10/2000 | Coyle | |
| 6,230,832 B1 | | 5/2001 | von Mayenburg | |
| 6,302,228 B1 | | 10/2001 | Cottereau | |
| 6,837,324 B2 | * | 1/2005 | Nagai et al. | 180/68.3 |
| 6,848,524 B2 | * | 2/2005 | Vaillancourt et al. | 180/68.1 |

* cited by examiner

*Primary Examiner*—Hau Phan
(74) *Attorney, Agent, or Firm*—James R. Williams

(57) ABSTRACT

The present invention describes an opening for engine compartment cooling. The opening includes a one-way valve that permits airflow only at speed. The valve allows cooling air to circulate past the engine without impeding the efficiency of the radiator. The size, shape and number of openings and valves may vary depending on cooling capacity or styling considerations. The opening includes a leading edge followed by an indentation defining a port for a one-way valve. A valve is fixed in the port so that airflow can occur only in one direction.

14 Claims, 3 Drawing Sheets

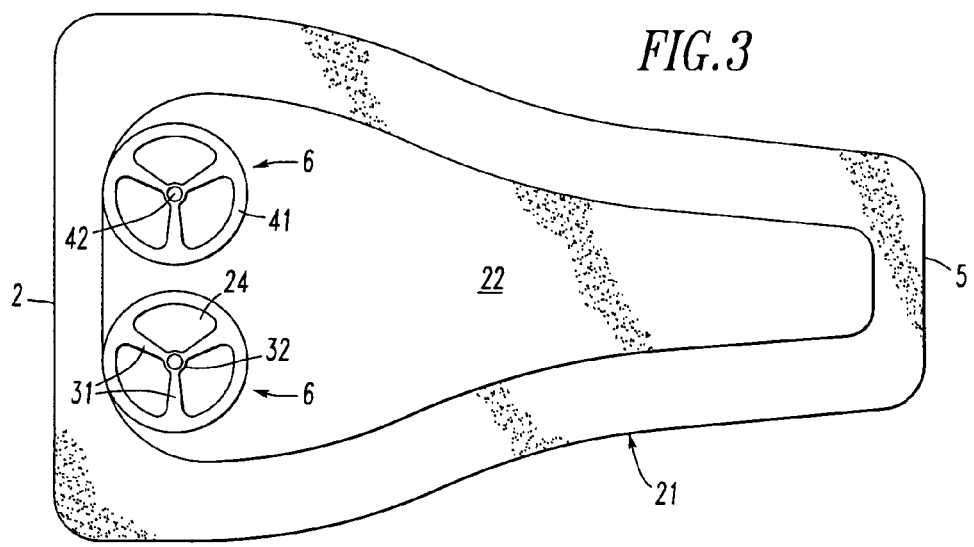
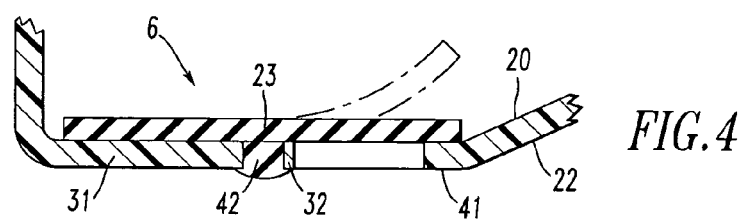
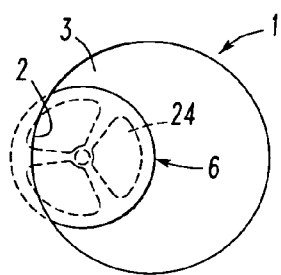
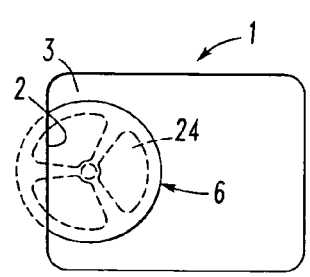

ONE-WAY AIR DUCT FOR ENGINE COMPARTMENT COOLING

FIELD OF THE INVENTION

The invention relates to an air vent for an engine compartment hood of a motor vehicle, and is adapted to cool the engine compartment while the motor vehicle is in motion.

BACKGROUND OF THE INVENTION

Demand for improved fuel economy has compelled motor vehicle manufacturers to increase engine efficiency and reduce weight of their vehicles. Replacing metal, where possible, with lighter materials, such as plastics and composites, has contributed to lighter vehicles with resultant increases in fuel economy. For example, hoods for the engine compartments of large trucks are now most often made from substantially non-metallic materials, such as fiberglass or plastics.

Engine efficiency and emissions are substantially reduced by increasing the operating temperature of the engine. A coolant system comprising a liquid coolant flowing through an engine and a radiator is most commonly used to regulate engine temperature. This system does little to reduce heat transfer from the engine to a hood so, as the engine's operating temperature increases, the hood temperature also increases. At such elevated temperatures, engine life is reduced and non-metallic hood materials tend to warp or degrade, which can lead to safety and aesthetic concerns.

Prior art has attempted to remove heat from an engine compartment using openings to the outside. Such openings include vents or ducts. The various air openings of prior art permit airflow both into and out of the engine compartment, and do not restrict flow to a particular direction. This can decrease cooling efficiency at low speeds by pulling air through the openings in a reverse direction so that cooling air can by-pass the radiator.

U.S. Pat. No. 6,302,228 to Cottereau et al. teaches at least one continuous duct located between the hood and the engine. The duct includes a forward inlet positioned at the front of the vehicle for receiving air, at least one aspirator inlet, and an outlet for directing the air from duct. The aspirator inlet opens into the engine compartment. The velocity of the air in the duct, and correspondingly reduced pressure, relative to the hot air in the engine compartment sucks the hot air into the duct. In this manner, the temperature of the engine compartment may be reduced thereby reducing the operating temperature of the engine. Unfortunately, Cottereau requires a complex duct system integrated with the hood of a vehicle. This adds considerable to cost and also adds undesirable weight to the hood.

U.S. Pat. No. 6,230,832 to Mayenburg et al. teaches an underhood airflow management system. The system permits air to entire the engine compartment at the forward end of the compartment. Air flows past the engine and exits at cowl openings at the rear of the engine compartment. The cowl openings are substantially vertical slits. Preferably, the compartment is sealed to prevent air from escaping before passing over the engine. In operation, the cowls do not positively draw air from the compartment.

Prior art also teaches engine compartment hoods having vents that provide air for combustion. U.S. Pat. No. 5,042,603 to Olson teaches a modified NACA duct for the air intake of an internal combustion engine. In the field of aeronautics, the National Advisory Council on Aeronautics has defined air intake ducts of a specific configuration as NACA ducts. Such ducts include a narrow and shallow leading edge and a wider and deeper trailing edge having a port for air intake. Olson teaches a NACA duct having a cover plate and base member for removing surface water from the engine's air intake stream. Olson does not use the duct to cool the engine compartment. Other vented hoods for engine air intake do not use NACA ducts. For example, U.S. Pat. No. 5,618,323 to Shearn describes a combustion air intake comprising a duct and a chamber for deceleration of the airflow. The chamber is adapted to remove moisture from the airflow. U.S. Pat. No. 4,971,172 teaches an air duct comprising several bends, whereby liquid water is prevented from reaching the engine air intake.

Assemblies are known for supplying cooling air to an internal combustion engine, particularly engines which are air-cooled only. Such engines often include cooling fins and cowlings surrounding the engines that direct air over the fins. Directing means includes vents, ducts, scoops and the like. With air-cooled engines, constant airflow is essential to avoid overheating, especially at idle. Heat transfer considerations make air-cooling impractical for large engines. Further, difficulties in maintaining constant operating temperatures make air-cooled engines less efficient than their liquid-cooled counterparts.

New emission standards and higher operating temperatures require a cooling system that reduces the temperature of an engine compartment of a liquid-cooled internal combustion engine. Benefits would include improved engine life and reduced temperature of a surrounding cowling or hood. Prior art has resorted to complex ducting systems or, relatively ineffective, simple forced air vents. In no case is airflow mechanically restricted to a single direction. Further, prior art openings often divert air around the radiator, thereby decreasing cooling efficiency of a radiator at idle

SUMMARY OF THE INVENTION

The present invention describes an airflow opening in the hood of a motor vehicle having a liquid-cooled internal combustion engine. The opening includes a one-way valve that permits airflow only at speed. The valve allows cooling air to circulate past the engine without impeding the efficiency of the radiator. The size, shape and number of openings may vary depending on the needed cooling capacity or styling considerations.

In a broad aspect, the airflow opening includes a leading edge followed by an indentation defining a port having a one-way valve. In one embodiment, the opening comprises a modified NACA duct. The modified duct is progressively shallower from the leading edge to the trailing edge. The leading edge includes a bottom, which defines a port for airflow. A one-way valve is fixed in the port so that airflow can occur only in one direction.

In another embodiment, the duct is integrated into a hood of a vehicle having an internal combustion engine. The hood defines an engine compartment around the engine. At idle, a one-way valve prevents air from flowing into the engine compartment through the duct. Radiator efficiency at idle is, therefore, unaffected. At speed, a pressure differential between the engine compartment and the air within the duct forces hot air from the engine compartment through the one-way valve.

In one aspect, the one-way valve comprises a flexible membrane seated in the port. Conveniently, the port includes a flattened perimeter that permits the membrane to rest in the port. Ribs extending from the perimeter prevent the membrane from deforming towards the engine compartment. The ribs may converge at a hub, thereby providing an anchoring point for the membrane. The membrane comprises any suitable material capable of flexing sufficiently under the pressure differential. Such materials include thin films, such as polyethylene terephthalate, polyoelfins, acetates, and various elastomers, such as urethanes, natural and synthetic rubbers and their copolymers.

BRIEF DESCRIPTION OF THE DRAWINGS

FIG. 3 shows an interior plane view of the embodiment of FIG. 2.

FIG. 4 shows a cross-sectional side view of an embodiment of a one-way valve.

FIG. 5 shows another embodiment of the present invention.

FIG. 6 shows another embodiment of the present invention.

DETAILED DESCRIPTION OF THE INVENTION

Figure 1:
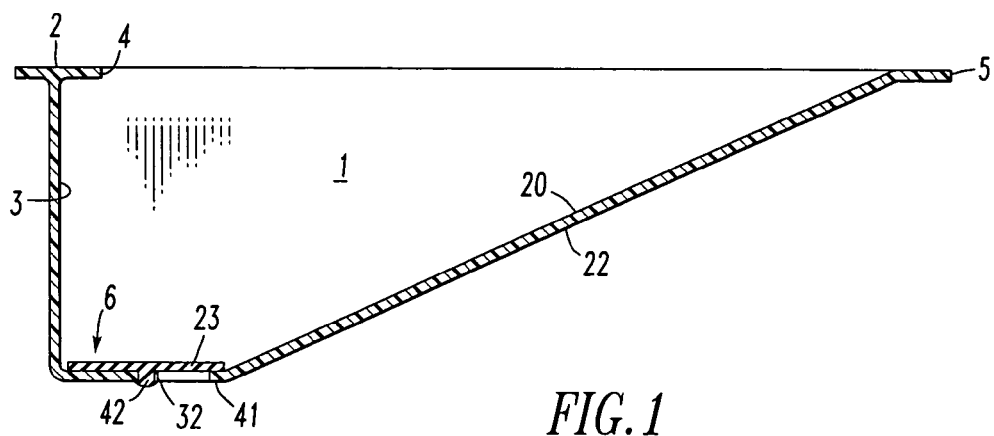
FIG. 1 shows a cross-sectional side view of the airflow opening of the present invention.

The present invention describes an airflow opening for use on a hood of an engine compartment of a motor vehicle. The motor vehicle includes a front end and a rear end. FIG. 1 shows a cross-sectional view of the airflow opening along 1—1 of FIG. 2. The opening 1 may be of any shape and includes a leading edge 2 and an indentation 3, which is indented into the engine compartment. The indentation 3 is at least partially rearward of the leading edge 2 but a portion of the indentation may actually be forward of the leading edge.

Preferably, the leading edge 2 and indentation 3 are separated by an abrupt transition 4, such as a step. The transition 4 produces a pressure differential between the leading edge 2 and the indentation 3. Commonly, the indentation 3 will include a trailing edge 5 that rises up to or near the level of the leading edge. In one embodiment, the leading and trailing edges define a plane.

The indentation defines a port having a one-way air valve 6. The valve 6 permits air to exit the engine compartment and substantially prevents air from entering the engine compartment. The valve 6 and pressure differential affect the volume of air exiting the engine compartment. Pressure differential may be increased by placing the port forward of the leading edge, thereby creating a region of lower pressure.

Figure 2:
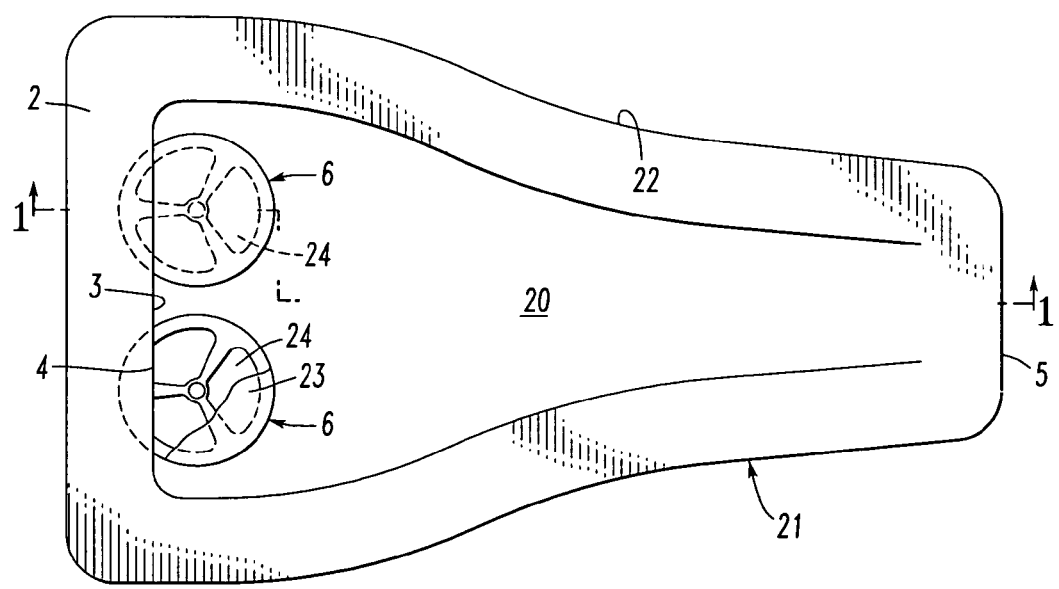
FIG. 2 shows an exterior plane view of an embodiment of the present invention.

FIG. 2 shows a front face 20 of one embodiment of the present invention comprising a modified NACA duct 21 including a leading edge 2 and a narrower trailing edge 5. The leading edge 2 has an indentation 3 having a depth that decreases towards the trailing edge 5. The bottom defines at least one port having a one-way air valve 6. The valve 6 permits airflow only from the back face 22 to the front face 20 of the duct 21. In the embodiment of FIG. 2, the valve 6 comprises a flexible membrane 23 covering each of two ports, 24.

FIG. 3 shows the back face 22 of the duct 21 of FIG. 2. The one-way valve 6 comprises a membrane 23 supported by ribs 31 across each port. The ribs 31 substantially prevent the membrane 23 from bending towards the back face 22. Conveniently, the ribs join at a hub 32 at which the membrane 23 can be attached to the port 24.

FIG. 4 shows a cross-section of a one-way valve 6 comprising a membrane 23. Ribs 31 extend from a flattened perimeter 41 of the port and join at a hub 32. The flattened perimeter 41 permits the membrane 23 to lay flat and completely cover the port 24. The membrane 23 is attached to the hub 32 with a pin 42. At speed, the membrane 23 will bend upwards, as depicted by the dashed line, and permit air to flow through the opening.

FIGS. 5 and 6 show alternative embodiments of the invention. The openings 1 are substantially circular and rectangular, respectively. Importantly, both embodiments include a leading edge 2 at least partially before an indentation 3. The indentation 3 defines a port 24 for a one-way air valve 6.

Figure 7:
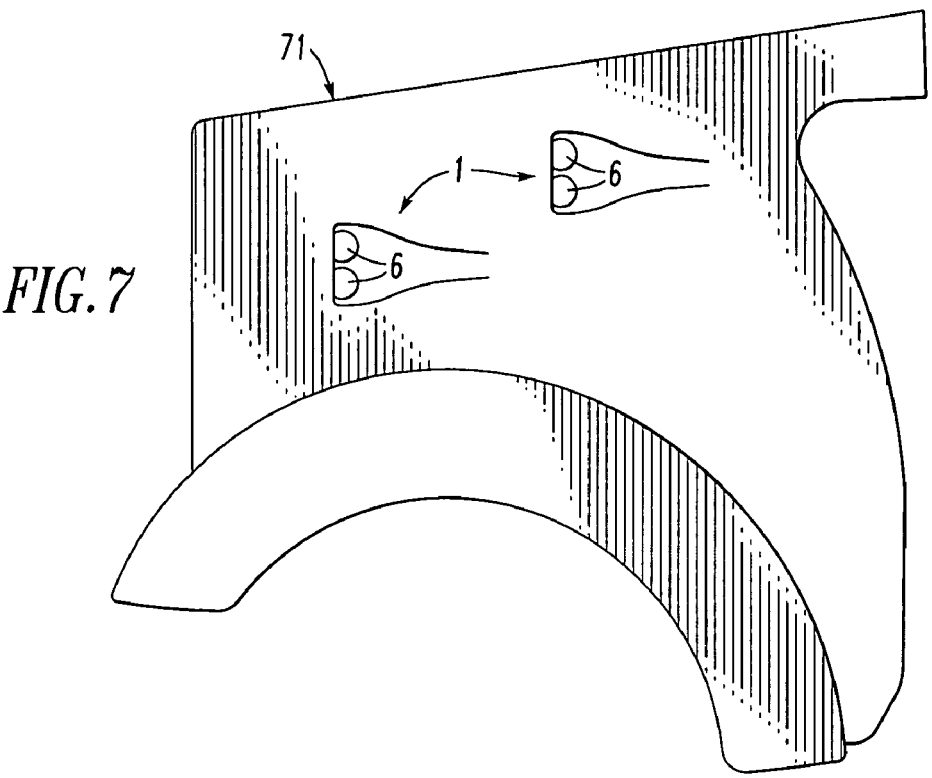
FIG. 7 shows an embodiment of the airflow opening integrated into a truck hood.
Figure 8:
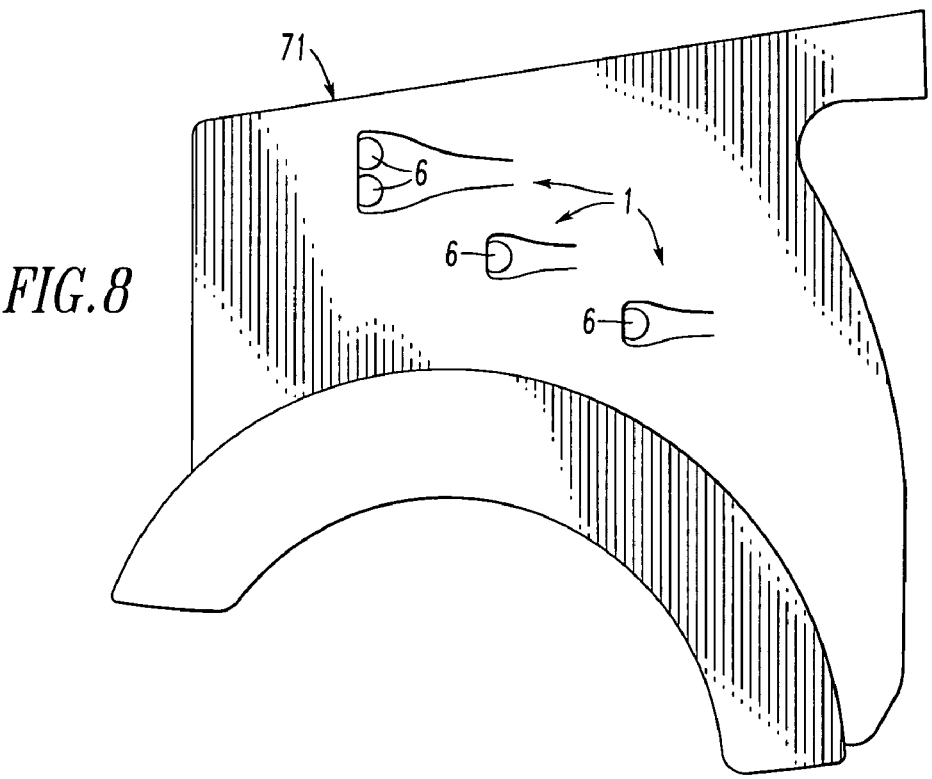
FIG. 8 shows an alternative embodiment of the airflow opening integrated into a truck hood.

The opening may be used to vent hot air from an engine compartment of an internal combustion vehicle. FIGS. 7 and 8 show truck hoods comprising openings of the present invention. FIG. 7 shows openings 1 in the side of a truck hood 71. The openings include dual one-way valves 6. FIG. 8 shows a truck hood 71 having a plurality of openings 1, including a dual valve and single valve openings. Engineering and design considerations will determine the position, size and shape of each opening and number and shape of valves in each opening. Larger openings will often include a plurality of valves.

In one preferred embodiment, the leading edge of the opening should be wider than the trailing edge. As a motor vehicle is moving, this configuration creates a pressure differential that draws hot air from the engine compartment through the one-way valve. Various factors influence the pressure differential, including the speed of the vehicle, size of the duct, width of the leading edge, depth of the duct and size of the ports. For example, at idle, the engine fan draws air into the engine compartment. The membrane remains closed around the port and no air can circulate through the duct. Cooling efficiency of the radiator is, therefore, not compromised at idle because no air circulates through the duct. At increasing speeds, the pressure differential increases and the membrane flexes more, so that more hot air discharges from the engine compartment.

Ports may generally be of any shape. Preferably, ports will lack corners to reduce stress concentrations, so the ports will most often be circular, oval or have rounded corners. One-way valves may be of any size, shape or configuration so as to fit within the ports. One-way valves may include reeds, membranes or other materials common in the manufacture of such valves. Simplicity of design and ease of manufacture and repair recommend one-way valves comprising a membrane. With membrane-containing valves, a circular port is preferable because a membrane fitted to the port will not easily pass through the port should the membrane become rotated relative to the port.

The membrane should be flexible and, in its unflexed position, should seat in the port so that air does not easily pass through the port. The membrane comprises any suitable material capable of flexing sufficiently under the pressure differential created by the duct. Such materials include thin films, such as polyethylene terephthalate, polyoelfins, acetates, and various elastomers, such as urethanes, natural and synthetic rubbers and their copolymers. Any convenient mechanical device may secure the membrane within the port. For example, the membrane may be attached to a hub of a plurality of ribs. The membrane should seat in the port so that substantially no air passes through the port when the valve is closed. To this end, the port may include a flattened area adapted to receive the perimeter of the membrane.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed:

1. An opening in a hood of a motor vehicle for cooling an engine compartment, the hood having a front and a rear and an outer surface, the opening comprising:
    a) a leading edge defining at least part of a periphery of the opening;
    b) an indentation defining a volume, the indentation extending from the leading edge and inward toward the engine compartment from the outer surface, the indentation at least partially rearward of the leading edge and defining at least one port; and
    c) a valve in the port, the valve capable of opening and closing and permitting airflow only out of the engine compartment.

2. The opening of claim 1, wherein the valve comprises a membrane.

3. The opening of claim 2, wherein the membrane includes a perimeter that seats on a flattened surface of the port.

4. The opening of claim 1, wherein the port includes a plurality of ribs joining at a hub.

5. The opening of claim 4, wherein the valve is secured to the port at the hub.

6. The opening of claim 1, wherein the opening includes a trailing edge rearward of the leading edge and defining at least a second part of the periphery of the opening.

7. The opening of claim 6, wherein the leading edge and trailing edge define a plane.

8. The opening of claim 6, wherein the indentation has a depth that decreases from the leading edge to the trailing edge.

9. The opening of claim 6, wherein the leading edge has a leading width, the trailing edge has a trailing width, and the trailing width is less than the leading width.

10. The opening of claim 1, wherein an intersection of the indentation and the leading edge includes an abrupt transition.

11. The opening of claim 1, wherein at least a portion of the indentation is forward of the leading edge.

12. The opening of claim 11, wherein at least one port is at least partially forward of the leading edge.

13. An opening in a hood of a motor vehicle for cooling an engine compartment, the hood having a front and a rear and an outer surface, the opening comprising:
    a) a leading edge defining at least part of a periphery of the opening;
    b) an indentation defining a volume, the indentation extending from the leading edge and inward toward the engine compartment from the outer surface, the indentation at least partially rearward of the leading edge and defining at least one port having a plurality of ribs joined at a hub; and
    c) a valve in the port that permits airflow only out of the engine compartment, the valve comprising a membrane having a perimeter that seats on a flattened surface of the port and secured to the port at the hub.

14. An engine hood for a motor vehicle having a front, a rear and an internal combustion engine, the hood having an outer surface and defining an engine compartment around at least a portion of the engine, the hood comprising a cooling duct comprising:
    a) a leading edge having a leading width and defining at least part of a periphery of the opening;
    b) an indentation defining a volume, the indentation extending from the leading edge and inward toward the engine compartment from the outer surface, the indentation at least partially rearward of the leading edge defining at least one port; and
    c) a valve in the port, the valve capable of opening and closing and permitting airflow only out of the engine compartment.

* * * * *